Patented July 11, 1939

2,165,315

UNITED STATES PATENT OFFICE 2,165,315

PIGMENT

Svend S. Svendsen, Madison, Wis., assignor, by mesne assignments, to The Sherwin-Williams Company, Cleveland, Ohio, a corporation of Ohio No Drawing. Application January 13, 1936, Serial No. 58,893

24 Claims. (Cl. 134—58)

This invention relates to improvements in titanium oxide pigments and to the process of making such an improved pigment. It relates specifically to a titanium oxide pigment having silica intimately associated therewith such as is produced by a co-precipitation process and having the characteristics of titanium oxide. This invention relates to processes and products described in my copending applications Serial Nos. 614,043, filed May 27, 1932 (now Patent No. 2,042,434, granted May 26, 1936), and 745,753, filed September 27, 1934 (now Patent No. 2,042,435, granted May 26, 1936), of which this application is a continuation in part.

When titanium bearing ores, such as ilmenite, preferably after fine grinding, are treated with a reactive fluoride, such as acid ammonium fluoride at reacting temperatures, either in the wet or dry way, the silica and silicates usually present as an impurity in such ores are attacked as well as the titanium of the ore. An excess of fluoride is used to secure complete reaction. If the reaction is carried out in the dry way the amminotetrafluorides of titanium and silicon may be volatilized from the reaction mixture at temperatures above about 270° C. The mixed amminotetrafluorides may be treated with water and ammonia to produce mixed hydroxides of titania and silica as described in said applications. If the reaction mass is kept at a temperature below that at which volatilization of the amminotetrafluoride compounds occurs and is leached with water, the titanium and a part of the silicon are removed in the leach liquor as water soluble fluoride compounds. After purifying the solution the titanium and silicon are precipitated as hydroxides by means of ammonia from the leach liquor preferably by adding the leach liquor to an excess of ammonia, and the mixed hydroxides calcined to produce a mixture of oxides having excellent pigment qualities. If the reaction of the ore with the reactive fluoride such as acid ammonium fluoride is carried out in the wet way, water soluble fluoride compounds of titanium and silicon are formed. The reaction is usually substantially complete before all of the water is driven off of the reaction mass. These compounds after leaching them with water from the reaction mass, are treated with ammonia to form the mixed hydroxides which subsequently are calcined. The insoluble residue consists largely of fluoride compounds, such as iron ammonium fluoride.

The non-alkaline fluoride solution of titanium and silicon together with the excess ammonium fluoride which results from the described leaching operations is purified and the traces of heavy metals, especially iron, are removed prior to the precipitation operation. This may be done by adding a soluble sulfide, such as ammonium sulfide to the solution of the fluoride salts after being made substantially neutral with ammonia. The sulfides and any other insolubles are filtered from the solution. The filtered solution, which may be boiled to remove residual volatile sulfides, is reacted with ammonia for the coprecipitation of the mixed hydroxides of silicon and titanium preferably by adding it to an ammonia solution so that ammonia is present throughout the precipitation. This reaction may be carried out at room temperatures but is more conveniently carried out at higher temperatures, about 50° to 0° C., because of the greater solubility of the reacting salts. The mixed hydroxides are removed from the liquor, as by filtering, washed to remove substantially all of the residual fluorides and ammonia, and then calcined to the proper temperature for the proper length of time to produce thereby a pigment of the desired tinting strength. The titanium hydroxide usually is transformed thereby into a crystalline form of titanium oxide. The temperature necessary to secure the desired properties ordinarily ranges from about 850° to 1100° C. depending upon various factors such as the time of calcination, the amount of silica present and the presence of mineralizer.

The separate particles of calcined co-precipitated titania and silica so produced are in an extremely fine state of division, usually less than 1 micron in average diameter and often ranging down to less than 0.25 micron. In a specific example, where up to 10% of silica is present with the titania, each separate calcined particle appears under the petrographic microscope to be crystallized titania indicating that each particle is an intimate and uniform mixture of silica and titania. It is impossible to distinguish separate silica particles under the most powerful type of petrographic microscope at present available for such work. The index of refraction of such particles is that of substantially pure titanium oxide made and treated in the same way. The specific gravity, however, of the calcined co-precipitated product decreases as the silica content increases, the specific gravity of silica being substantially less than half that of the calcined titania. It is apparent that the silica intimately associated with the titania as described does not affect appreciably some of the physical properties so that certain of the properties of the mixed particles are not substantially different from those of pure titania particles.

It is necessary to calcine such a co-precipitated material at an increasing temperature above about 850° C. as the silica content increases in order to effect the anatase crystallization of the titania which is the basis for most paint pigments. For example, a titania containing 10% silica is heated at about 1025° C. for 60 minutes in order to effect the anatase crystallization. If the calcining temperature is raised to a point well above this, say 1050° C., the product becomes hard and it also begins to assume a yellow tint when cold. With 3 percent of silica present the calcining temperature is lower—about 985° C., and with 20% of silica about 1045° C. Pure titanium oxide turns hard at lower temperatures and also turns a gray brown color at these temperatures, this color becoming more intense the higher the temperature. This color seems to be associated with the rutile crystal modification of titania in the absence of appreciable amounts of intimately associated silica, as described. The silica present in intimate association with the titania or the hydroxide as described apparently raises the temperature at which crystallization of the titania occurs.

The co-precipitated pigment after being calcined to the anatase modification may be used as a white paint pigment, since it has the necessary whiteness and covering power. It also may be used as a pigment in lacquers, enamels (including vitreous types), paper, etc., in general, wherever pigments of this type have been used. In comparison to substantially pure titania, after being ground to the proper fineness for pigment purposes, it mixes more easily with colors in oil and does not settle as readily when suspended in a paint vehicle. It seems to grind more readily and is less sticky thereby increasing the capacity of the mill. There also is less agglomeration of the particles which are dispersed more readily. It also bulks to a greater degree. When used as a paint pigment it has a high mobility. This characteristic mobility and flowability may be increased by calcining the mixed hydroxides in the presence of a small amount of residual, soluble fluoride, specifically residual ammonium fluoride in an amount of from 1 percent to 5 percent of the oxide as desired by incompletely washing the hydroxides. The ammonium fluoride also may be added in the desired proportions after washing the residual salts from the hydroxides. For example, a typical product formed as herein described has a mobility as determined by the mobilometer test described in Gardner's "Physical and Chemical Examinations of Paints, Varnishes, Lacquers and Colors" (6th ed., 1933) of less than 10 seconds; for example, of about 4 seconds. Titanium oxide pigments as hitherto produced have much lower mobility, as indicated by mobilometer readings in general in the order of 20 seconds and higher. The greater flowability is a decided advantage when grinding the pigment with colors in oil or when it is necessary to make a uniform dry mixture of pigments or other powdered materials with the titania.

In this application I make no distinction between ammonium fluoride and ammonium bifluoride in their chemical reaction with the titanium oxygen compounds although the compounds do differ somewhat in their physical characteristics.

The preferred co-precipitated pigments of my invention may contain up to 25% of silica, though the best range is from 5% to 15% of silica. My invention, however, is not limited to a titania pigment containing less than 25% of silica. In some cases it is desirable to produce such a co-precipitated pigment in which the silica exceeds the titania, for example, 75% of silica and 25% of titania. When reference is made to the calcining of titanium hydroxide, with or without coprecipitated silicon hydroxide, to form the anatase modification, it is understood that the calcined material need not be composed entirely of anatase since it is usually impossible to control conditions sufficiently accurately in large scale operations so that all of the titania will be in this form. Some may still be in the amorphous form indicating under-calcination or some may be in the rutile form indicating over-calcination. The anatase predominates, however.

Whenever the hydroxides of silicon or titanium are referred to the term "hydroxides" covers the precipitate formed as indicated. Authorities differ as to the composition of the precipitate which may be a hydrate, an hydroxide, or an hydroxide which may be hydrated.

I claim:

1. A pigment having characteristics of a pure titanium oxide pigment, comprising particles of intimately associated calcined titanium and silicon oxides formed from coprecipitated titanium and silicon hydroxides.

2. A pigment comprising particles of intimately associated calcined titanium and silicon oxides formed from coprecipitated titanium and silicon hydroxides, said pigment containing an amount of titania which is in excess of the silica.

3. A pigment comprising particles of intimately associated calcined titanium and silicon oxides formed from coprecipitated titanium and silicon hydroxides and having an index of refraction approximating that of anatase.

4. A pigment comprising particles of intimately associated calcined titanium and silicon oxides formed from coprecipitated titanium and silicon hydroxides and having a specific gravity lower than that of calcined titanium oxide having substantially the same crystal structure, most of said pigment particles showing anatase crystallization.

5. A pigment comprising particles of intimately associated calcined titanium and silicon oxides formed from coprecipitated titanium and silicon hydroxides and in which silica can not be detected under the petrographic microscope in the co-precipitated particles thereof.

6. A pigment comprising particles of intimately associated calcined titanium and silicon oxides formed from coprecipitated titanium and silicon hydroxides and having an index of refraction approximating that of anatase, each of said particles having the appearance of calcined titanium hydrate and having the silica and titania sufficiently intimately associated so that silica can not be detected under the petrographic microscope.

7. A pigment comprising particles of intimately associated titanium and silicon oxides formed from coprecipitated titanium and silicon hydroxides and which discolors to a yellow tint on heating to a temperature somewhat above the anatase modification temperature.

8. A pigment having characteristics of a titania pigment, comprising particles of intimately associated calcined titanium and silicon oxides formed from coprecipitated titanium and silicon hydroxides and which may be heated without appreciable discoloration to a temperature above that at which pure titanium oxide discolors when heated.

9. A pigment having characteristics of a titania pigment, comprising particles of intimately associated calcined titanium and silicon oxides formed from coprecipitated titanium and silicon hydroxides and which has the property of producing a paint of high mobility as indicated by a mobilometer reading of less than 10 seconds.

10. Co-precipitated titanium and silicon hydroxides, which on calcination at a temperature which produces anatase form crystals form a mixture of oxides in which the silica can not be detected under the petrographic microscope.

11. A pigment comprising particles of intimately associated calcined titanium and silicon oxides formed from coprecipitated titanium and silicon hydroxides and containing not more than 25% of silicon.

12. A pigment comprising particles of intimately associated calcined titanium and silicon oxides formed from coprecipitated titanium and silicon hydroxides and containing from 5% to 15% of silica and consisting essentially of anatase crystals.

13. Co-precipitated titanium and silicon hydroxides which on calcining at 1050° C. form a mixture of oxides which do not become colored with a gray-brown tint.

14. A pigment comprising particles of intimately associated calcined titanium and silicon oxides formed from coprecipitated titanium and silicon hydroxides and which does not become colored with a gray-brown tint when heated at 1050° C. and consists essentially of anatase crystals.

15. The method of making a pigment comprising titania and silica in which silica can not be detected under the microscope when heated to form anatase crystals which comprises forming a solution of a mixture of fluoride salts of titanium and silicon with the titanium salts in substantial excess of the silicon salts, reacting said solution with ammonia in such a manner as to co-precipitate the hydroxides of titanium and silicon, separating said hydroxides from the mother liquor, and calcining said co-precipitated hydroxides.

16. The method of claim 15 in which a small amount of ammonium fluoride is allowed to remain in said mixed hydroxides, the amount being sufficient to harden the mixed oxides to produce a pigment having the property of producing a paint of high mobility.

17. The method of making a pigment comprising titania and silica which comprises forming a solution of a mixture of fluoride salts of titanium and silicon, adding said solution to an ammonia solution to co-precipitate the hydroxides of titanium and silicon and in such a manner that ammonia is present in excess throughout said precipitation reaction, separating said hydroxides from the mother liquor, and calcining said co-precipitated hydroxides.

18. In the method of making intimately associated titania and silica from a solution containing the mixed fluorides of titanium and silicon, the step which comprises co-precipitating said hydroxides from said solution by means of ammonia in the presence of an excess of ammonia throughout the precipitation reaction.

19. The method of making a pigment comprising titania and silica which comprises mixing pulverized ilmenite ore containing silica as an impurity with a substantial excess of ammonium fluoride in the presence of water, heating said mixture until the titanium oxide has reacted in large part with said fluoride but without driving off all of the water from the reaction mass, leaching the resultant mass with water, treating the leach liquor with ammonia under such conditions that an hydroxide of titanium is precipitated in the presence of an excess of ammonia throughout the reaction, and calcining the precipitate.

20. The method of making a pigment comprising titania and silica which comprises treating a titanium oxide ore containing iron and silicon in appreciable quantities with ammonium fluoride at elevated temperatures, the conditions of reaction and the amount of ammonium fluoride used being such that substantially all of the titanium and silicon present in said ore is converted into water soluble fluoride salts and substantially all of the iron present in said ore is converted into a double fluoride salt of iron and ammonium substantially insoluble in water, said reaction being carried out at a temperature low enough to prevent volatilization of silicon fluoride compounds, leaching the reaction product with water, removing the iron impurity remaining in said leach liquor, reacting said leach liquor with ammonia under such conditions that the titanium is precipitated as an hydroxide, and calcining the precipitate.

21. In the production of a pigment comprising titania and silica from titanium-bearing materials containing silicon as an impurity, effecting solution of an ammonium titanium-fluoride compound together with the silicon fluoride compound resulting from said silicon impurity in a non-alkaline solution containing ammonium fluoride, simultaneously precipitating as hydroxide the titanium and silicon by adding said solution to ammonium hydrate in excess, whereby ammonia is present throughout the precipitation reaction, and calcining the precipitate.

22. A paint, lacquer, enamel or the like comprising a pigment having the characteristics of a pure titanium oxide pigment and comprising particles of intimately associated calcined titanium and silicon oxides formed from coprecipitated titanium and silicon hydroxides as herein described.

23. A pigment having the characteristics of a pure titanium dioxide pigment comprising particles showing anatase crystal formation, each particle comprising titanium dioxide and silica in intimate association formed by the calcination of coprecipitated titanium and silicon hydroxides.

24. The method of making a pigment comprising titania and silica which comprises mixing pulverized ilmenite ore containing silica with a substantial excess of ammonium fluoride in the presence of water, heating said mixture until the titanium oxide has reacted in large part with said fluoride, leaching the resultant mass with water, treating the leach liquor to remove iron, treating the resultant purified leach liquor with ammonia under such conditions that hydroxide of titanium is precipitated in the presence of an excess of ammonia throughout the reaction, and calcining the coprecipitated hydroxides of titanium and silicon produced thereby at a temperature high enough to produce the oxides therefrom.

SVEND S. SVENDSEN.

CERTIFICATE OF CORRECTION.

Patent No. 2,165,315. July 11, 1939.

SVEND S. SVENDSEN.

It is hereby certified that error appears in the printed specification of the above numbered patent requiring correction as follows: Page 1, second column, line 13, for "0° C." read 60° C.; page 3, first column, line 14, claim 11, for "silcon" read silica; and that the said Letters Patent should be read with this correction therein that the same may conform to the record of the case in the Patent Office.

Signed and sealed this 8th day of August, A. D. 1939.

(Seal)
Leslie Frazer,
Acting Commissioner of Patents.